US012619649B1

(12) United States Patent
Mendelson et al.

(10) Patent No.: US 12,619,649 B1
(45) Date of Patent: May 5, 2026

(54) LARGE LANGUAGE MODEL INPUT PREPROCESSING AND REFINEMENT

(71) Applicant: INTUIT INC., Mountain View, CA (US)

(72) Inventors: Shon Mendelson, Tel Aviv (IL); Gal Elgavish, Tel Aviv (IL); Hadar Lackritz, Tel Aviv (IL); Kaaleb Edery, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/935,242

(22) Filed: Nov. 1, 2024

(51) Int. Cl.
*G06F 16/35* (2025.01)
*G06F 40/20* (2020.01)

(52) U.S. Cl.
CPC .............. *G06F 16/35* (2019.01); *G06F 40/20* (2020.01)

(58) Field of Classification Search
CPC ................................. G06F 16/35; G06F 40/20
See application file for complete search history.

(56) References Cited

U.S. PATENT DOCUMENTS

| | | | | |
|---|---|---|---|---|
| 2013/0346067 | A1* | 12/2013 | Bhatt ...................... | G06F 40/30 704/9 |
| 2019/0121842 | A1* | 4/2019 | Catalano ............... | G06F 40/247 |
| 2021/0157950 | A1* | 5/2021 | Turano ................ | G06F 21/6245 |
| 2022/0210109 | A1* | 6/2022 | van Rensburg ....... | H04L 67/535 |
| 2022/0377035 | A1* | 11/2022 | Shapiro ................. | H04L 51/046 |
| 2024/0089227 | A1* | 3/2024 | Gupta ................... | H04L 51/212 |
| 2024/0281472 | A1* | 8/2024 | LaRhette ............ | G06F 16/9558 |
| 2024/0320267 | A1* | 9/2024 | Sriharsha .............. | G06F 16/242 |

* cited by examiner

*Primary Examiner* — Dangelino N Gortayo
(74) *Attorney, Agent, or Firm* — DLA PIPER LLP US

(57) ABSTRACT

At least one processor can receive a text input from a user interface (UI) comprising at least a portion of a prompt to a large language model (LLM). The at least one processor can classify the text input as having a negative sentiment classification using a machine learning (ML) model configured to classify inputs according to expected user sentiments in reaction to an LLM response, the ML model being configured to classify the inputs from available classifications including at least a positive sentiment classification and one or more available negative sentiment classifications. In response to the classifying, the at least one processor can prevent input of the prompt to the LLM, determine information to add to the prompt to change the negative sentiment classification to the positive sentiment classification, and cause the UI to display a reply requesting the information to add to the prompt.

20 Claims, 4 Drawing Sheets

300

200

202 – receive training data set with question/sentiment pairs

204 – perform sentiment analysis on training data set

206 – classify sentiments as positive or negative using NLP

208 – label negative sentiment classifications

210 – fine-tune pre-trained ML language model

300

LARGE LANGUAGE MODEL INPUT PREPROCESSING AND REFINEMENT

BACKGROUND

With the increasing use of chatbots based on large language models (LLMs), and as users' expectations for more accurate and relevant responses from them continue to rise, users often experience the problem of chatbots generating unsatisfactory or irrelevant responses when they do not have enough information. Moreover, each time a user solicits a response from a chatbot, tokens must be sent from the requesting computing system to the LLM, the LLM must generate a response, and the user must review the response and request more information if it is unsatisfactory. This is costly in terms of tokens, network use, and chatbot latency.

BRIEF DESCRIPTIONS OF THE DRAWINGS

DETAILED DESCRIPTION OF SEVERAL EMBODIMENTS

Systems and methods described herein can provide automatic preprocessing of user inputs to chatbots or other LLM-based interactive systems to improve both the user experience and system performance. To identify and address potential issues in real-time, disclosed embodiments can train a question classifier offline using sentiment analysis with natural language processing (NLP)-based classification methods. Upon deployment, this classifier can analyze user inputs and predict when additional context or clarification may be needed to enhance response quality and prevent hallucinations by the LLM. In real-time, following the classifier's prediction, the chatbot can prompt the user to rephrase the question or provide more context. By taking these actions, the systems and methods described herein can improve the response quality of the chatbot to enhance overall user experience and reduce unnecessary costly calls to an LLM.

Disclosed embodiments can improve the user experience of chatbot interactions by automatically identifying when additional context or a rephrasing of the user's question is required to enhance the chatbot's response. As a result, the chatbot can deliver more accurate, relevant, and helpful responses. Moreover, LLM usage typically follows a pay-per-token pricing model; and generating tokens, sending tokens to an LLM, and obtaining a response from the LLM is also costly in terms of latency, network use, and processing. By classifying user questions before interacting with an LLM, disclosed embodiments can reduce or even effectively eliminate unnecessary prompts being sent to the LLM chatbot. This results in a reduction of operational costs and latency associated with LLM chatbots.

Figure 1:
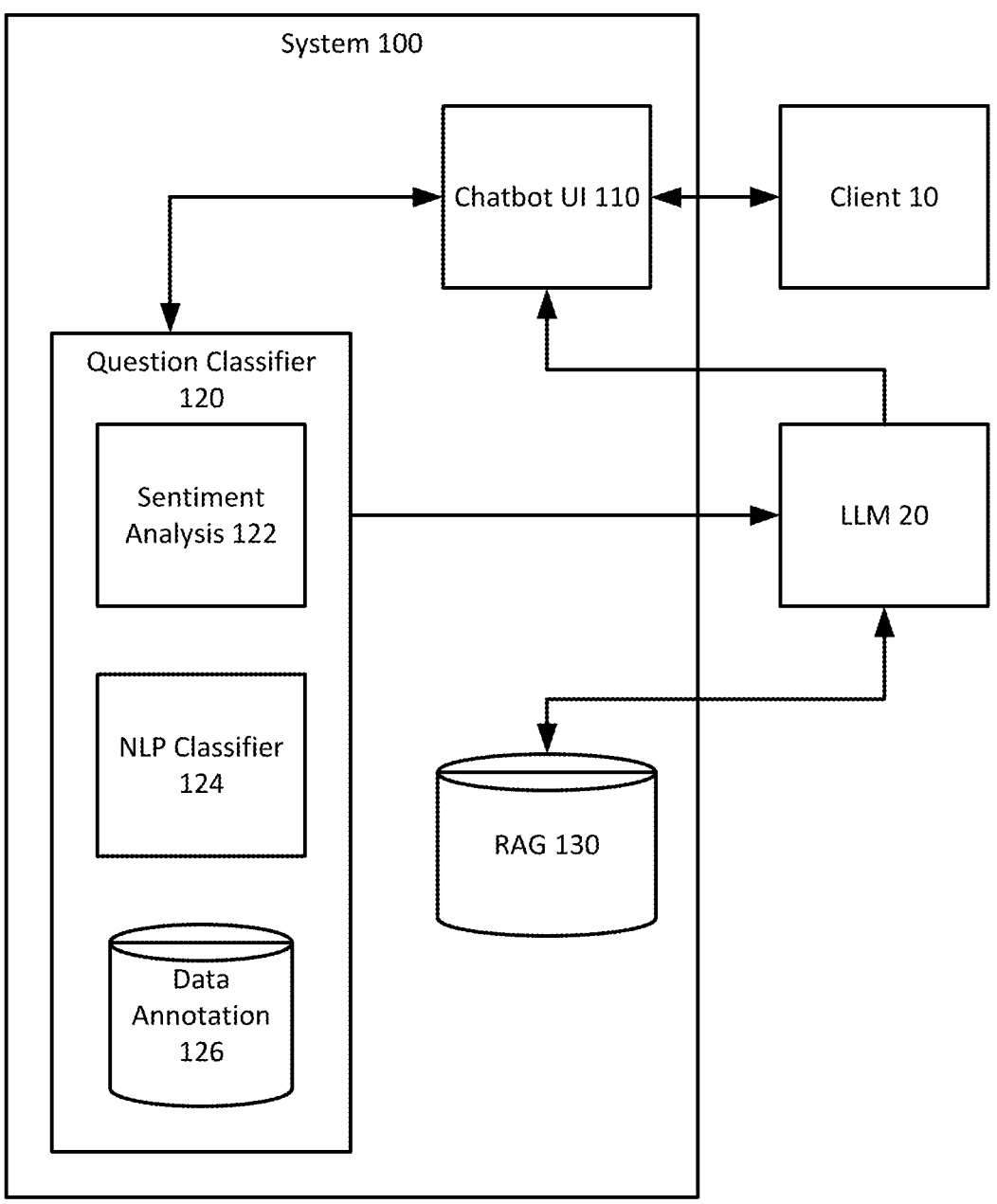
FIG. 1 shows an example LLM input preprocessing and refinement system according to some embodiments of the disclosure.

FIG. 1 shows an example LLM input preprocessing and refinement system 100 according to some embodiments of the disclosure. System 100 may include a variety of hardware, firmware, and/or software components that interact with one another and/or with external components, such as client 10 and/or LLM 20. The components of system 100 can include, for example, chatbot user interface (UI) 110, question classifier 120 (which may include offline processing components such as sentiment analysis model 122, NLP classifier 124 and/or data annotation 126), and/or retrieval augmented generation (RAG) database 130. While not illustrated as such, RAG database 130 may be external to system 100 in some embodiments, and/or LLM 20 may be included within system 100 in some embodiments. These elements are described in greater detail below, but in general, a user of client 10 can interact with chatbot UI 110, including by asking a question. Question classifier 120 can process the question to determine whether or not it is likely to cause LLM 20 to deliver a meaningful response. If so, question classifier 120 can pass the question as at least part of a query to LLM 20, which can use data from RAG database 130 and/or its own data to provide an answer to the question which can then be shown in chatbot UI 110. If the question is not likely to yield a meaningful response, question classifier 120 can provide different information for presentation in chatbot UI 110 and avoid contacting LLM 20.

Some components within system 100 may communicate with one another using networks and/or locally. Some components may communicate with external components, such as client 10 and/or LLM 20, through one or more networks (e.g., the Internet, an intranet, and/or one or more networks that provide a cloud environment) and/or by other modes of data transfer. Each component may be implemented by one or more computers (e.g., as described below with respect to FIG. 4).

Elements illustrated in FIG. 1 (e.g., system 100 (including chatbot UI 110, question classifier 120 and its components, and/or RAG database 130), client 10, and/or LLM 20) are each depicted as single blocks for ease of illustration, but those of ordinary skill in the art will appreciate that these may be embodied in different forms for different implementations. For example, while client 10, LLM 20, and system 100 are depicted separately, any combination of these elements may be part of a combined hardware, firmware, and/or software element. Likewise, while various elements such as chatbot UI 110, question classifier 120 and its components, and/or RAG database 130 are depicted as parts of a single system 100, any combination of these elements may be distributed among multiple logical and/or physical locations. Also, while one client 10, one LLM 20, and one system 100 are illustrated, this is for clarity only, and multiples of any of the above elements may be present. In practice, there may be single instances or multiples of any of the illustrated elements, and/or these elements may be combined or co-located.

As described in detail below, system 100 can perform processing to improve LLM response quality and avoid making unnecessary calls to LLM 20. For example, FIGS. 2-3 illustrate the functioning of the illustrated components in detail.

In the following descriptions of how system 100 functions, several examples are presented. However, those of ordinary skill in the art will appreciate that these examples are merely for illustration, and system 100 and its methods of use and operation are extendable to other application and data contexts.

Figure 2:
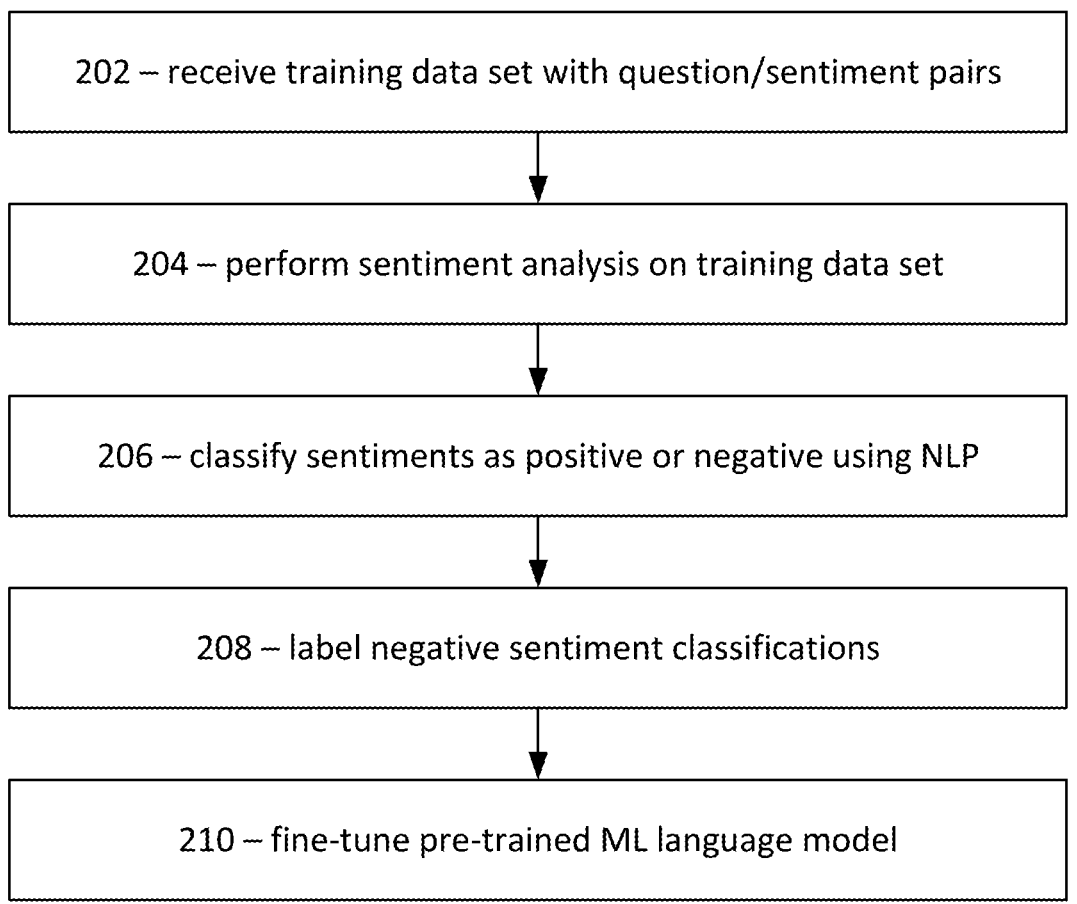
FIG. 2 shows an example question classifier configuration process according to some embodiments of the disclosure.
Figure 3:
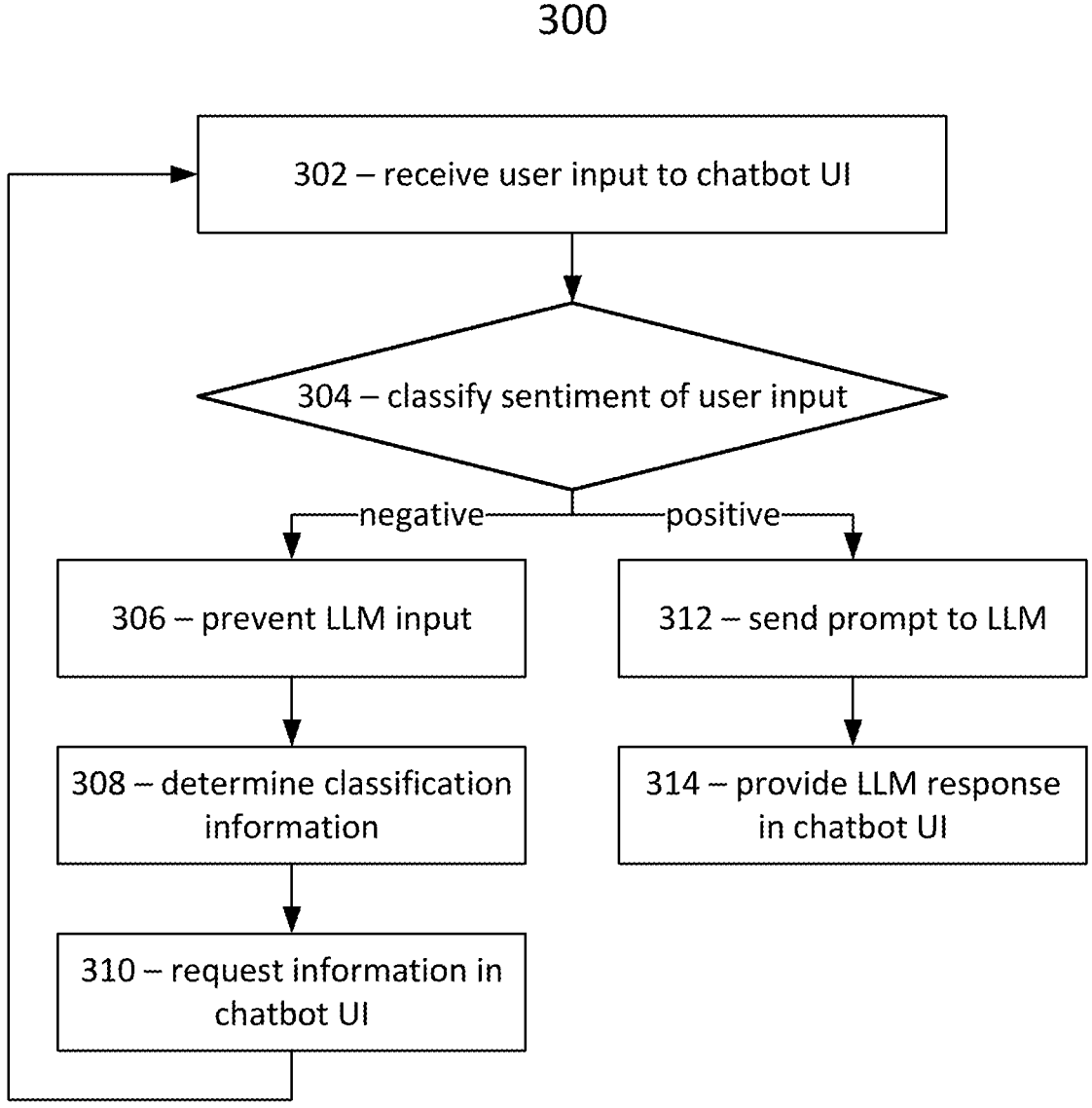
FIG. 3 shows an example LLM input preprocessing and refinement process according to some embodiments of the disclosure.

FIG. 2 shows an example question classifier configuration process 200 according to some embodiments of the disclosure. By performing process 200, system 100 can configure question classifier 120 to analyze questions input from client 10 into chatbot UI 110 and determine whether to request more information from the user of client 10 or prompt LLM 20. Process 200 can be an offline process performed before deploying system 100 to actively cooperate with client 10 and LLM 20. System 100 can also perform process 200 repeatedly as updated training data becomes available, for example as users continue to ask questions of the chatbot and respond to the chatbot's answers.

At 202, system 100 can receive training data. The training data can include at least one training data set comprising a plurality of pairs of questions and corresponding user sentiments. For example, the questions can be real questions entered by users into chatbot UI 110 and/or other UIs. The questions can be questions posed to LLM 20 and/or other LLMs. The questions included in the training data can be questions that were actually answered by LLM 20, so that a user actually received a response from LLM 20 and reacted to the response. The user's reaction to the response, entered into chatbot UI 110 and/or other UIs, can be a corresponding user sentiment that may be indicative of whether the user thought the response was a good response or a bad response.

For example, assume the chatbot from which the training data was generated is a tax assistant configured to answer tax-related questions as part of a UI of a tax preparation software product. A user may have asked "How do I disclose a new home purchase?" LLM 20 may have provided an answer including detailed information about which U.S. Federal tax forms to use to disclose a new home purchase. The user's response may be something positive such as "Thanks!" In some cases, LLM 20 may include, in its answer, a question such as "Did this answer help?" The user can respond positively, with "yes" or similar. In this case, the question is "How do I disclose a new home purchase?" and the sentiment is "Thanks!" or "yes." As described in detail below, system 100 can label this pair as having a positive sentiment while performing process 200.

However, in another example, a user may have asked "How do I disclose a new home purchase in my Canadian tax filing?" In this example, LLM 20 can be configured to answer questions about U.S. taxes, and may not have information about Canadian tax procedures available for RAG. Accordingly, LLM 20 can reply with an incorrect or incomplete response. The user's reaction can indicate confusion, or can say that the response was not helpful, or in some other way indicate a negative reaction. As described in detail below, system 100 can label the question and sentiment response pair as having a negative sentiment while performing process 200.

At 204, system 100 can perform sentiment analysis on the training data received at 202, by which system 100 can automatically label the user responses with sentiment labels. For example, system 100 can process the training data set using a pre-trained sentiment analysis ML model 122, thereby producing a labeled training data sent. Pre-trained sentiment analysis ML model 122 can be a BERT-based sentiment analysis model or other known or proprietary ML model configured to input language and output a sentiment label. In the examples discussed herein, the labels can include "positive" and "negative" or labels having similar meanings, along with a probability value (e.g., from 0-1) indicating how likely the label is to be correct.

At 206, system 100 can classify sentiments identified at 204 as positive or negative. In some embodiments, system 100 can remove any pairs of questions and corresponding user sentiments that have not been labeled as either "positive" or "negative" or their equivalents from the training set. For example, pairs may be unlabeled or labeled "neutral" or similar, and these pairs may be removed. In some embodiments, even if a pair is labeled "positive" or "negative," system 100 can remove such labeled pairs having probability values less than some threshold. For example, system 100 can only keep labeled pairs with a probability value of 0.8 or higher. Removing ambiguous pairs, like unlabeled/neutral pairs and/or low probability label pairs, can improve the reliability of the data produced by process 200 and, accordingly, the efficacy of system 100 when deployed. System 100 can output a classified data set with pairs that remain after removal having "positive" or "negative" labels.

At 208, system 100 can label negative sentiments as determined at 206. While the segments are labeled "negative" after processing at 204, system 100 can further refine the output by labeling each pair of the labeled training data set having a negative sentiment with a negative sentiment classification. The negative sentiment classifications may vary by embodiment, and in some cases may be extensible such that classifications can be added and/or removed.

As an example, system 100 can use two negative sentiment classifications in some embodiments, "lack of context" and "phrasing." A lack of context classification can indicate that the negative sentiment was due to a poor response by LLM 20 because LLM 20 did not have enough contextual data to provide a coherent, useful, or complete response. A phrasing classification can indicate that the negative sentiment was due to a poor response by LLM 20 because the initial question to LLM 20 was poorly phrased or otherwise difficult to understand.

Using the example of these two negative segment classifications, each question and corresponding user sentiment pair can be labeled with "lack of context," "phrasing," or "other," where "other" means the reason for the negative sentiment is unclear or does not fit one of the designated categories. In some embodiments, human annotators can annotate the question and corresponding user sentiment pairs and provide the annotations to system 100. System 100 can remove the pairs labeled with "other" from the training data set and store the completed set in data annotation database 126.

After this labeling at 208, the labeled training data set can include pairs with positive sentiment labels, pairs with lack-of-context negative sentiment labels, and pairs with phrasing negative sentiment labels. For example, these may be expressed as (user question, class) where the class is one of "positive," "negative: lack of context," and "negative: phrasing." Positive questions may be considered as likely to be answered by LLM 20 to meet user expectations. Negative: lack of context questions may be considered unlikely to be answered by LLM 20 to user satisfaction due to lack of context for LLM 20. Negative: phrasing questions may be considered unlikely to be answered by LLM 20 to user satisfaction due to poor phrasing of the question itself.

At 210, system 100 can fine tune a pre-trained ML language model on the labeled training data set as produced at 208. For example, the pre-trained ML language model can be ROBERTa or another known or proprietary ML model that can classify input text. Using a pre-trained model enables system 100 to achieve high accuracy in deployment without requiring an excessively large training data set. To ensure that the pre-trained model is configured to identify the positive sentiments and types of negative sentiments labeled at 208, system 100 can fine-tune the pre-trained ML language model with the labeled training data set from data annotation database 126. Once fine-tuned, the pre-trained ML language model can serve as NLP classifier 124 that can preprocess and refine LLM inputs as described in detail below.

In some embodiments, system 100 can collect and analyze user-system interactions on a recurring basis, such as weekly, to periodically enhance the performance of question classifier 120. In this case, system 100 can repeat process 200 periodically and thereby refine the language model tuning and overall system performance.

FIG. 3 shows an example LLM input preprocessing and refinement process 300 according to some embodiments of the disclosure. System 100 can perform process 300 as an inference phase of ML processing as system 100 is in production and interacting with client(s) 10 and users thereof. For example, when client 10 is in communication with system 100, chatbot UI 110 can cause UI display on a display device of client 10 and accept user inputs through an input device of client 10, such as a keyboard. A user can type a question into a chatbot field of chatbot UI 110, and system 100 can perform process 300 using the question as input.

At 302, system 100 can receive a user input entered into chatbot UI 110. For example, the user input can include a first text input. The first text input can form at least a portion of a first prompt to LLM 20. For example, system 100 may be configured to incorporate the first text input into a prompt that may have additional instructions for responding in some embodiments. In other embodiments, system 100 may be configured to pass the first text to LLM 20 as a prompt without embellishment. In either case, system 100 can preprocess the first prompt as follows and, as such, may determine whether to send the prompt or restrict sending of the prompt.

At 304, system 100 can classify the sentiment of the user input received at 302. Question classifier 120, which may have been provisioned by system 100 performance of process 200 as described above, can receive the first text input gathered at 302. Question classifier 120 can classify the first text input as having a negative sentiment classification using the above-described trained ML model (e.g., NLP classifier 124) configured to classify inputs according to expected user sentiments in reaction to an LLM response. As described above, NLP classifier 124 may be configured to classify the inputs from available classifications including at least a positive sentiment classification and one or more available negative sentiment classifications, such as "negative: lack of context," and "negative: phrasing."

If the classification is negative, at 306, system 100 can prevent input of the user text and/or any prompts based thereon or including the user text to LLM 20. Because calls to LLM 20 are resource intensive, blocking and/or otherwise preventing the user's input from reaching LLM 20 in response to a negative classification provides performance and cost advantages.

At 308, system 100 can determine classification information for the user text. For example, depending on which negative sentiment classification NLP classifier 124 applied to the user text at 304, system 100 can identify information that can change the sentiment classification from negative to positive and/or a follow-up question configured to elicit the information. For example, if the predicted class is "negative: phrasing," system 100 can create or retrieve a stored message such as "I'm not sure that I've understood the question, can you please rephrase it?" If the predicted class is "negative: lack-of-context," system 100 can create or retrieve a stored message asking the user for additional information such as document sets related to the question. For embodiments having other negative sentiment classification options, each such negative classification option may have its own information for insertion into follow up questions for the user.

At 310, system 100 can request information in chatbot UI 110, for example by causing the UI to display a reply requesting the information to add to the first prompt. Instead of making resource intensive LLM call(s) when the predicted sentiment is negative, system 100 can identify one or more predetermined messages to ask the user for more context or to rephrase the question, as noted above. The approach helps the system scale better and provides a better user experience. Chatbot UI 110 can display such messages and receive user responses.

Upon receiving a user response to a message displayed at 310, system 100 can return to 304 and check the sentiment of the user response and/or the user's initial question received at 302 plus the user response in some embodiments. In this case, system 100 can receive a second text input from chatbot UI 110, classify the second text input as having the positive sentiment classification using NLP classifier 124, and in response to the classifying of the second text input, cause input of a prompt to LLM 20. In other embodiments, system 100 can proceed to 312 after receiving the user response.

If the classification is positive (or after receiving a user response in reply to the request at 310 in some embodiments), at 312, system 100 can send a prompt to LLM 20. The prompt can include some or all of the user input received at 302 (and/or additional information received in response to the request at 310 in some embodiments). LLM 20 can generate a response to the prompt. LLM 20 can use data from RAG database 130 and/or use additional documentation submitted by the user to generate the response in at least some embodiments. LLM 20 can use any known or proprietary RAG technique, where RAG is a neural information retrieval (IR) model that utilizes pre-trained language models to generate high-quality textual responses for user queries, leveraging relevant predefined passages. It can significantly improve the accuracy of responses provided by the chatbot, making it more useful to the user.

At 314, system 100 can provide the response from LLM 20 to the user in chatbot UI 110. In view of the positive sentiment predicted by system 100, the response can be expected to have a high likelihood of including a satisfactory answer to the user's question.

Figure 4:
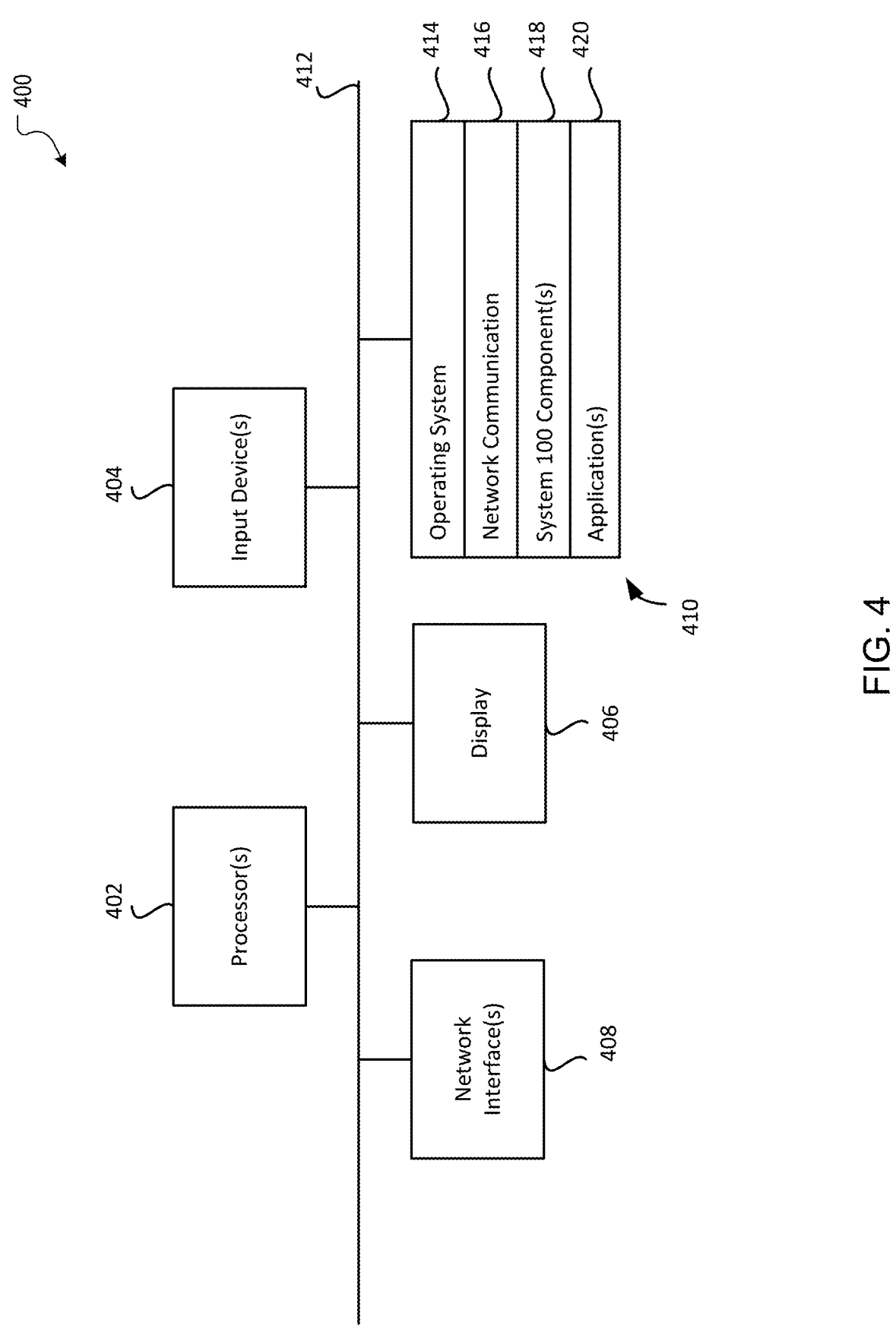
FIG. 4 shows an example computing device according to some embodiments of the disclosure.

FIG. 4 shows a computing device 400 according to some embodiments of the disclosure. For example, computing device 400 may function as system 100 or any portion(s) thereof, or multiple computing devices 400 may function as system 100.

Computing device 400 may be implemented on any electronic device that runs software applications derived from compiled instructions, including without limitation personal computers, servers, smart phones, media players, electronic tablets, game consoles, email devices, etc. In some implementations, computing device 400 may include one or more processors 402, one or more input devices 404, one or more display devices 406, one or more network interfaces 408, and one or more computer-readable mediums 410. Each of these components may be coupled by bus 412, and in some embodiments, these components may be distributed among multiple physical locations and coupled by a network.

Display device 406 may be any known display technology, including but not limited to display devices using Liquid Crystal Display (LCD) or Light Emitting Diode (LED) technology. Processor(s) 402 may use any known processor technology, including but not limited to graphics processors and multi-core processors. Input device 404 may be any known input device technology, including but not limited to a keyboard (including a virtual keyboard), mouse, track ball, and touch-sensitive pad or display. Bus 412 may be any known internal or external bus technology, including but not limited to ISA, EISA, PCI, PCI Express, NuBus, USB, Serial ATA or FireWire. In some embodiments, some or all devices shown as coupled by bus 412 may not be coupled to one another by a physical bus, but by a network connection, for example. Computer-readable medium 410 may be any medium that participates in providing instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 410 may include various instructions 414 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 404; sending output to display device 406; keeping track of files and directories on computer-readable medium 410; controlling peripheral devices (e.g., disk drives, printers, etc.) which can be controlled directly or through an I/O controller; and managing traffic on bus 412. Network communications instructions 416 may establish and maintain network connections (e.g., software for implementing communication protocols, such as TCP/IP, HTTP, Ethernet, telephony, etc.).

System 100 components 418 may include instructions for performing the processing described herein. For example, system 100 components 418 may provide instructions for performing any and/or all of process 200, process 300, and/or other processing as described above. Application(s) 420 may be an application that uses or implements the outcome of processes described herein and/or other processes. In some embodiments, the various processes and/or portions thereof may also be implemented in operating system 414.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

receiving, by at least one processor, a first text input from a user interface (UI), the first text input comprising at least a portion of a first prompt to a large language model (LLM);

classifying, by the at least one processor, the first text input as having a negative sentiment classification using a machine learning (ML) model configured to classify inputs according to expected user sentiments in reaction to an LLM response, wherein the ML model is configured to classify the inputs from available classifications including at least a positive sentiment classification and a plurality of available negative sentiment classifications, each respective one of the plurality of available negative sentiment classifications defining a respective cause of negative sentiment;

in response to the classifying, preventing, by the at least one processor, input of the first prompt to the LLM;

determining, by the at least one processor, information to add to the first prompt to change the negative sentiment classification to the positive sentiment classification, the information corresponding to the cause of negative sentiment defined by the negative sentiment classification; and causing, by the at least one processor, the UI to display a reply requesting the information to add to the first prompt.

2. The method of claim 1, further comprising:

receiving, by the at least one processor, a second text input from the UI;

classifying, by the at least one processor, the second text input as having the positive sentiment classification using the ML model; and in response to the classifying of the second text input, causing, by the at least one processor, input of a prompt to the LLM.

3. The method of claim 2, wherein:

the second text input is received after causing the UI to display the reply;

the second text input includes the information; and the prompt input to the LLM comprises the first prompt and the information.

4. The method of claim 1, wherein:

the plurality of available negative sentiment classifications comprise at least one of:

a lack of context classification indicating negative sentiment due to a lack of contextual data available to the LLM for preparing the LLM response; and a phrasing classification indicating poor phrasing in the first prompt.

5. The method of claim 1, further comprising configuring, by the at least one processor, the ML model to classify the inputs, wherein the configuring comprises:

receiving, by the at least one processor, a training data set comprising a plurality of pairs of questions and corresponding user sentiments; and processing, by the at least one processor, the training data set using a pre-trained sentiment analysis ML model, thereby producing a labeled training data set wherein the plurality of pairs are respectively classified as having a positive sentiment classification or a negative sentiment.

6. The method of claim 5, wherein the configuring further comprises labeling, by the at least one processor, each pair of the labeled training data set having a negative sentiment with a respective one of the plurality of available negative sentiment classifications.

7. The method of claim 5, wherein:

the ML model comprises a pre-trained language model; and the configuring further comprises fine-tuning, by the at least one processor, the ML model on the labeled training data set.

8. A method comprising:

receiving, by at least one processor, a training data set comprising a plurality of pairs of questions and corresponding user sentiments;

processing, by the at least one processor, the training data set using a pre-trained sentiment analysis machine learning (ML) model, thereby producing a labeled training data set wherein the plurality of pairs are respectively classified as having a positive sentiment classification or a negative sentiment;

labeling, by the at least one processor, each pair of the labeled training data set having a negative sentiment with a respective one of a plurality of available negative sentiment classifications, each respective one of the plurality of available negative sentiment classifications defining a respective cause of negative sentiment;

fine-tuning, by the at least one processor, a pre-trained ML language model on the labeled training data set; and causing, by the at least one processor, the fine-tuned pre-trained ML language model to be used in production to prevent input of at least one prompt to a large language model (LLM) in response to the fine-tuned pre-trained ML language model processing the at least one prompt and classifying the at least one prompt as having one of the plurality of available negative sentiment classifications, wherein fine-tuned pre-trained ML language model is configured to classify inputs from available classifications including at least the positive sentiment classification and the plurality of available negative sentiment classifications.

9. The method of claim 8, wherein using the fine-tuned pre-trained ML language model in production comprises:
receiving, by at least one production processor, a first text input from a user interface (UI), the first text input comprising at least a portion of a first prompt to the LLM;
classifying, by the at least one production processor, the first text input as having a negative sentiment classification using the fine-tuned pre-trained ML language model;
in response to the classifying, preventing, by the at least one production processor, input of the first prompt to the LLM;
determining, by the at least one production processor, information to add to the first prompt to change the negative sentiment classification to the positive sentiment classification, the information corresponding to the cause of negative sentiment defined by the negative sentiment classification; and
causing, by the at least one production processor, the UI to display a reply requesting the information to add to the first prompt.

10. The method of claim 9, wherein using the fine-tuned pre-trained ML language model in production further comprises:
receiving, by the at least one production processor, a second text input from the UI;
classifying, by the at least one production processor, the second text input as having the positive sentiment classification using the fine-tuned pre-trained ML language model; and
in response to the classifying of the second text input, causing, by the at least one production processor, input of a prompt to the LLM.

11. The method of claim 10, wherein:
the second text input is received after causing the UI to display the reply;
the second text input includes the information; and
the prompt input to the LLM comprises the first prompt and the information.

12. The method of claim 9, wherein:
the plurality of available negative sentiment classifications comprise at least one of:
a lack of context classification indicating negative sentiment due to a lack of contextual data available to the LLM for preparing the LLM response; and
a phrasing classification indicating poor phrasing in the first prompt.

13. The method of claim 8, further comprising:
determining, by the at least one processor, that a probability of a label of at least one of the plurality of pairs is below a threshold level; and
removing, by the at least one processor, the at least one of the plurality of pairs from the labeled training data set.

14. A system comprising:
at least one processor;
at least one non-transitory memory storing instructions that, when executed by the at least one processor, cause the at least one processor to perform processing comprising:

receiving a first text input from a user interface (UI), the first text input comprising at least a portion of a first prompt to a large language model (LLM);
classifying the first text input as having a negative sentiment classification using a machine learning (ML) model configured to classify inputs according to expected user sentiments in reaction to an LLM response, wherein the ML model is configured to classify the inputs from available classifications including at least a positive sentiment classification and a plurality of available negative sentiment classifications, each respective one of the plurality of available negative sentiment classifications defining a respective cause of negative sentiment;
in response to the classifying, preventing input of the first prompt to the LLM;
determining information to add to the first prompt to change the negative sentiment classification to the positive sentiment classification, the information corresponding to the cause of negative sentiment defined by the negative sentiment classification; and
causing the UI to display a reply requesting the information to add to the first prompt.

15. The system of claim 14, wherein the processing further comprises:
receiving a second text input from the UI;
classifying the second text input as having the positive sentiment classification using the ML model; and
in response to the classifying of the second text input, causing input of a prompt to the LLM.

16. The system of claim 15, wherein:
the second text input is received after causing the UI to display the reply;
the second text input includes the information; and
the prompt input to the LLM comprises the first prompt and the information.

17. The system of claim 14, wherein:
the plurality of available negative sentiment classifications comprise at least one of:
a lack of context classification indicating negative sentiment due to a lack of contextual data available to the LLM for preparing the LLM response; and
a phrasing classification indicating poor phrasing in the first prompt.

18. The system of claim 14, wherein the processing further comprises configuring the ML model to classify the inputs, wherein the configuring comprises:
receiving a training data set comprising a plurality of pairs of questions and corresponding user sentiments; and
processing the training data set using a pre-trained sentiment analysis ML model, thereby producing a labeled training data set wherein the plurality of pairs are respectively classified as having a positive sentiment classification or a negative sentiment.

19. The system of claim 18, wherein the configuring further comprises labeling each pair of the labeled training data set having a negative sentiment with a respective one of the one or more available negative sentiment classifications.

20. The system of claim 18, wherein:
the ML model comprises a pre-trained language model; and
the configuring further comprises fine-tuning the ML model on the labeled training data set.

* * * * *